United States Patent [19]

Tsuchiya et al.

[11] Patent Number: 4,570,946
[45] Date of Patent: Feb. 18, 1986

[54] NITRIDED PISTON RING WITH OUTER LAYER ON SURFACE

[75] Inventors: Takeshi Tsuchiya; Shuji Samejima, both of Saitama, Japan

[73] Assignee: Nippon Piston Ring Co., Ltd., Tokyo, Japan

[21] Appl. No.: 706,091

[22] Filed: Feb. 27, 1985

[51] Int. Cl.³ ............................ F16J 9/00; F02F 5/00
[52] U.S. Cl. .................................. 277/216; 277/1; 277/224; 277/235 A
[58] Field of Search .................. 277/1, 216, 223, 224, 277/234, 235 R, 235 A, 236, DIG. 6; 29/156.6, 156.63; 75/244, 245, 126 J; 148/12 R, 15.5, 16.6

[56] References Cited

U.S. PATENT DOCUMENTS

| | | | |
|---|---|---|---|
| 2,905,512 | 9/1959 | Anderson | 277/224 X |
| 4,299,401 | 11/1981 | McCormick | 277/216 |
| 4,407,515 | 10/1983 | Naito | 277/139 |

FOREIGN PATENT DOCUMENTS

| | | | |
|---|---|---|---|
| 1195110 | 6/1965 | Fed. Rep. of Germany | 277/224 |
| 2934027 | 4/1980 | Fed. Rep. of Germany | 277/224 |
| 662213 | 12/1951 | United Kingdom | 277/235 A |
| 1057570 | 2/1967 | United Kingdom | 277/235 A |

OTHER PUBLICATIONS

*The Iron Age*, "Case Hardening with Nitrides," Aug. 5, 1926, pp. 340 and 341.

*Primary Examiner*—Robert S. Ward
*Attorney, Agent, or Firm*—Finnegan, Henderson, Farabow, Garrett & Dunner

[57] ABSTRACT

A piston ring provided with a nitriding layer at entire surfaces of the piston ring body to form a compound layer and a diffusion layer, so that a compound layer is formed over the diffusion layer. From an outer peripheral surface of the piston ring body, the compound layer or both compound layer and diffusion layers is removed, and the plating or spraying layer is formed on the exposed diffusion layer or the exposed surface of the piston ring body.

9 Claims, 2 Drawing Figures

NITRIDED PISTON RING WITH OUTER LAYER ON SURFACE

BACKGROUND OF THE INVENTION

The present invention relates to a piston ring for use in an internal combustion engine, and more particularly, to a type thereof capable of being employed in the internal combustion engine which uses high lead content fuel or which is exposed to corrosive atmosphere.

At present, while employment of non lead or lead free fuel has been progressing in light of the problem of public pollution, the employment of an internal combustion engine which uses high lead content fuel is also available throughout the world. In the internal combustion engine employing high lead content fuel, in order to avoid excessive wear, thick chromium plating is provided onto an outer peripheral surface of the ring so as to sustain extensively corrosive atmosphere such as HCl atmosphere.

However, sufficient effect has not been obtainable in light of productivity and cost.

On the other hand, a piston ring whose sliding portion is subjected to nitriding treatment has been developed. However, excessive wear such as scuffing may occur in accordance with specific operating condition of the engine. U.S. Pat. No. 4,407,515, commonly assigned, discloses a combined oil ring in which spacer expander and side rails are subjected to low temperature gas nitriding treatment. Further, co-pending U.S. application Ser. No. 571,630 discloses a piston ring having a ring body made of cast iron or steel having its entire surface provided with a soft-nitride layer, and outer peripheral surface provided with a spraying layer.

SUMMARY OF THE INVENTION

It is therefore, an object of the present invention to provide a piston ring which can obviate the above-described drawbacks of the conventional piston ring.

In the piston ring according to the present invention, a body is formed of steel or cast iron. Nitrided layer is formed over entire surfaces of the ring body. The nitriding layer includes a diffusion layer and a compound layer provided over the diffusion layer. At least the compound layer is removed from the nitriding layer at the outer peripheral portion of the piston ring body. Plating or spraying layer is formed over the exposed diffusion layer or exposed ring body surface.

According to a method of producing the piston ring of the present invention, entire surfaces of the piston ring body formed of steel or cast iron are provided with a nitriding layer to form an internal diffusion layer and a compound layer. Then, at least the compound layer is removed from the nitriding layer at an outer peripheral portion of the piston ring body. Thereafter, the exposed surface of the ring body or diffusion layer is subjected to spraying or plating treatment.

DETAILED DESCRIPTION OF THE INVENTION

Typical embodiments of the present invention will be explained referring to accompanying drawings.

Figure 1:
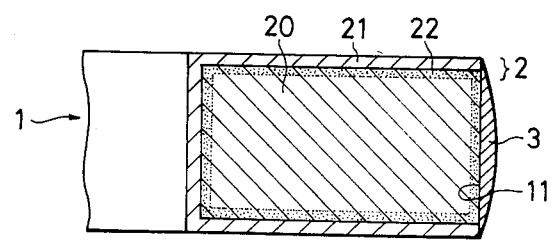
FIG. 1 is a cross-sectional view showing one embodiment of a piston ring according to the present invention.

FIG. 1 shows a cross-section of one embodiment of a piston ring according to the present invention, wherein a nitriding layer 2 is formed all over the surfaces of a piston ring body 20. The body 20 is formed of cast iron or steel. The nitriding layer 2 includes a diffusion layer 22 and a compound layer 21 provided at the outer side of the diffusion layer. The compound layer 21 is formed over the diffusion layer 22. The compound layer 21 of the nitriding layer 2 is removed at the outer periphery 11 of the piston ring 1 by a polishing operation, etc. so as to expose the diffusion layer 22, since sufficient joining between the compound layer and plating or spraying material mentioned below may not be obtainable. Thereafter, a plating or spraying layer 3 is formed on the exposed diffusion layer 22.

Figure 2:
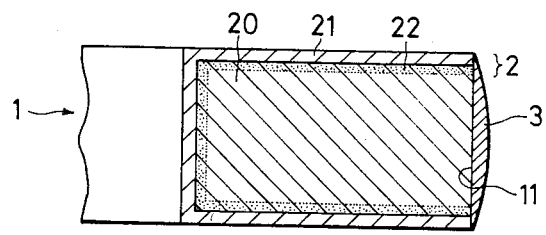
FIG. 2 is a cross-sectional view showing another embodiment of the present invention.

FIG. 2 shows a cross-section of another embodiment, wherein a nitriding layer 2 including compound and diffusion layers is removed at an outer peripheral surface 11 and then a plating or a spraying layer 3 is formed on the exposed ring body at the outer peripheral surface.

In this case, plating material may be chromium or a dispersion of discrete particles within a plated matrix compatible with a material of a cylinder or cylinder liner, and the spraying material may be ferrous material or molybdenum.

As described above, according to one embodiment of the present invention, after a compound layer is removed from the outer periphery of the piston ring, plating or spraying layer is formed on a diffusion layer, so that abnormal abrasion such as scuffing caused by sliding movement between the compound layer and a cylinder can be prevented.

According to another embodiment, after not only a compound layer but also a diffusion layer are removed from the outer periphery of the piston ring, a plating or a spraying layer is formed on an exposed base metal of the piston ring body, so that wear resistivity of the sliding surface of the piston ring can be improved when compared with a case where the diffusion layer having a thin hard layer is exposed to the cylinder.

Further, in both cases, the nitriding layers can prevent the planner side surfaces of the piston ring from being abraded due to the impact wear caused by the repeated impacts between the ring and the ring groove. Moreover, wear resistivity at the sliding surface can be improved because of synergetic effect brought by the employment of the nitriding layer and the plating or the spraying layer.

What is claimed is:

1. A piston ring comprising; a piston ring body formed of one of steel and cast iron; nitriding layer formed over said ring body surfaces, said nitriding layer including a diffusion layer and a compound layer provided over said diffusion layer; at the outer peripheral portion of said piston ring body, at least said compound layer being removed; and one of plating and spraying layer formed on the outer peripheral surface of said piston ring body.

2. A piston ring of claim 1, wherein said outer peripheral portion of said piston ring body is provided with diffusion layer only, and said one of plating and spraying layer is formed on said diffusion layer.

3. A piston ring of claim 1, wherein said one of plating and spraying layer is formed directly on said outer peripheral surface of said ring body.

4. A piston ring of claim 1, wherein said plating is formed of chromium.

5. A piston ring of claim 1, wherein said plating is formed of a disperation of discrete particles within a plated matrix.

6. A piston ring of claim 1, wherein said spraying layer is formed of ferrous material.

7. A piston ring of claim 1, wherein said spraying layer is formed of molybdenum.

8. A method for producing a piston ring comprising: the steps of preparing a piston ring body formed of one of steel and cast iron; forming nitriding layer at entire surfaces of said ring body to form an internal diffusion layer and a compound layer; removing at least said compound layer from said nitriding layer on an outer peripheral portion of said ring body; forming one of plating and spraying layer on the exposed outer peripheral surface of said ring body.

9. A method of claim 8, wherein both said compound and diffusion layer are removed from said nitriding layer on the outer peripheral surface of said ring body.

* * * * *